May 15, 1945.  D. R. SHOULTS  2,376,199
CONTROL FOR AIRCRAFT SUPERCHARGERS
Filed March 31, 1942  2 Sheets-Sheet 1
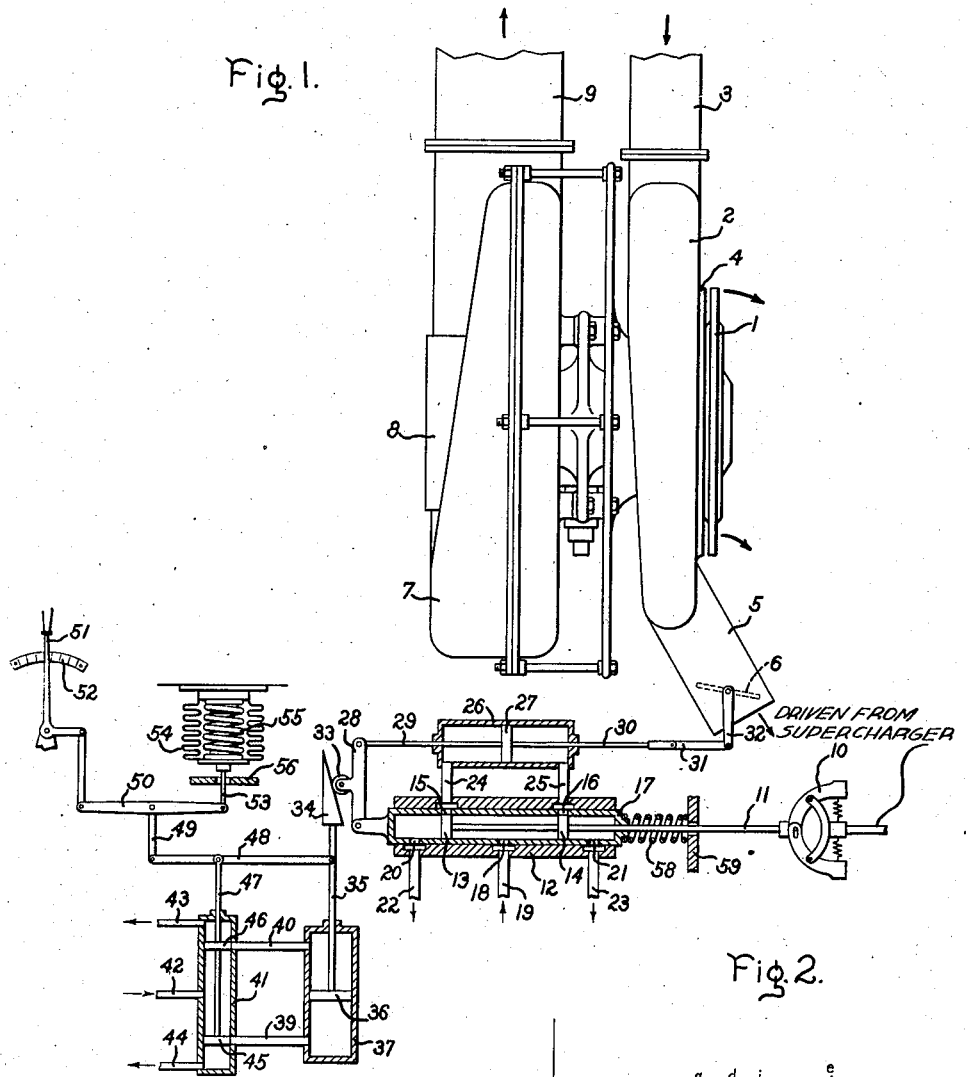
Inventor:
David R. Shoults,
by Harry E. Dunham
His Attorney.

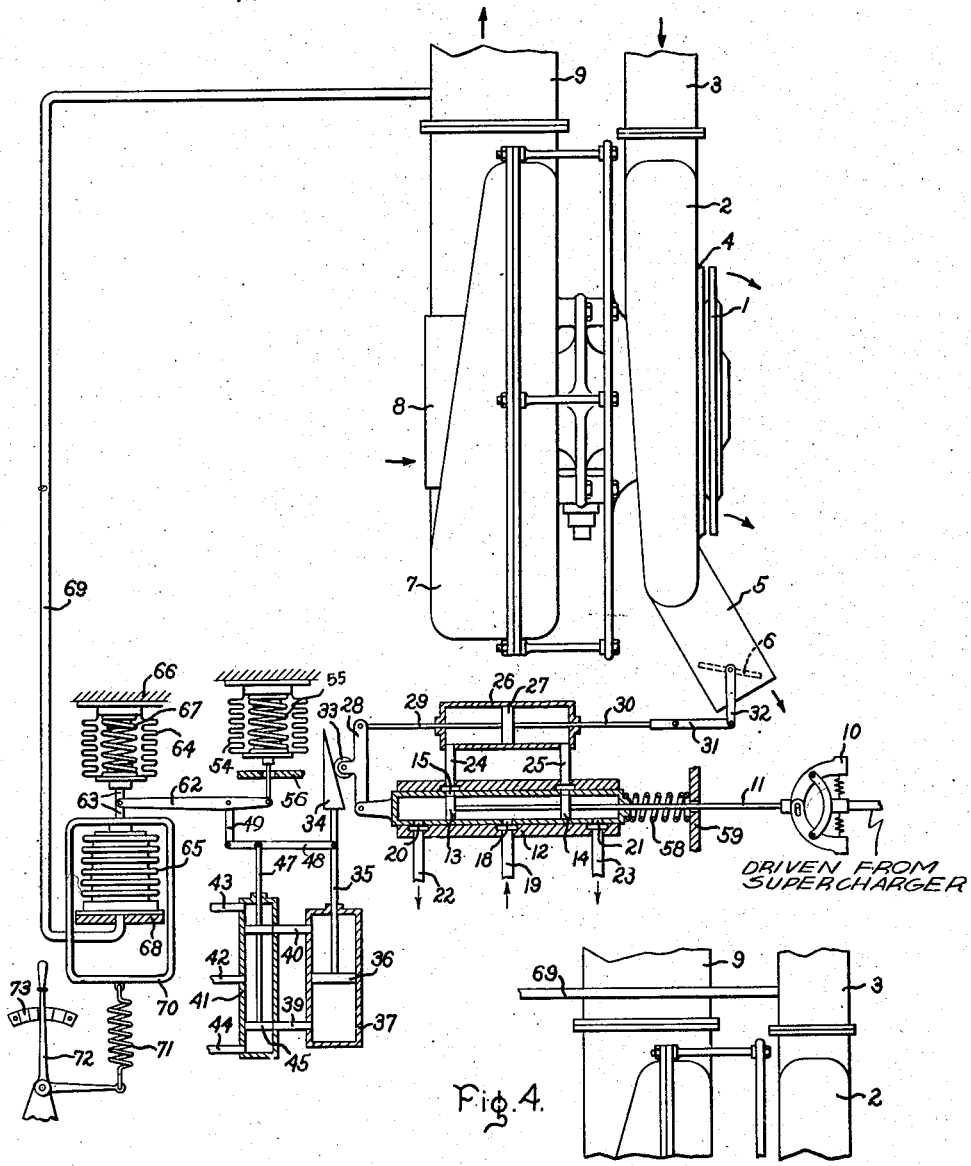

Patented May 15, 1945

2,376,199

UNITED STATES PATENT OFFICE 2,376,199

CONTROL FOR AIRCRAFT SUPERCHARGERS

David R. Shoults, Schenectady, N. Y., assignor to General Electric Company, a corporation of New York Application March 31, 1942, Serial No. 437,097

1 Claim. (Cl. 230—11)

The present invention relates to aircraft superchargers and particularly to control means therefor. It is especially applicable to superchargers of the type comprising a turbine wheel driven by exhaust gases from an aircraft engine, the turbine wheel driving a compressor which supplies air to the aircraft engine or to another point of consumption, such as a cabin. Such superchargers are termed usually turbo-superchargers.

In use, it is desired to control a turbo-supercharger so as to supply air at a constant desired pressure or at a constant rate of flow and to this end, governors responsive to pressure or responsive to rate of flow have been provided, such governors acting directly on the regulating means for the turbine, for example, a waste-gate valve. However, the control of turbo-superchargers presents unusual problems and difficulties due to the relatively large number of varying factors met with in the maneuvering of an aircraft, and, up to the present time, so far as I am aware, no wholly satisfactory control has been devised. To be satisfactory, a control must be stable and reliable in operation and give protection to the supercharger against overspeed.

The object of my invention is to provide an improved regulator for a turbo-supercharger, and for a consideration of what I believe to be novel and my invention, attention is directed to the following specification and to the claims appended thereto.

In the drawings, Fig. 1 is a diagrammatic view of a turbo-supercharger provided with a control means embodying my invention; Fig. 2 is a diagram; Fig. 3 is a view similar to Fig. 1 showing a modification embodying my invention, and Fig. 4 is a detail view of a further modification.

Referring to the drawings, 1 indicates the turbine wheel of a turbo-supercharger and 2 indicates the nozzle box. Exhaust gases from an aircraft engine are supplied to the nozzle box through a conduit 3 which connects with the exhaust manifold of the engine. The nozzle box is provided with nozzles 4 which direct exhaust gases from the nozzle box to the buckets of the turbine wheel for driving the wheel. Connected with the nozzle box is a waste conduit 5 through which exhaust gases may flow from the nozzle box directly to atmosphere. In conduit 5 is a waste-gate valve 6 which forms the regulator or control means for the supercharger. The compressor of the supercharger is indicated at 7. Air is supplied to the compressor through a central inlet 8 and is discharged through the conduit 9. Air is supplied to inlet 8 usually through a conduit which faces in the direction of the slip stream and conveys air from the slip stream to the eye of the compressor impeller. By this means, some compressing benefit is obtained due to the forward movement of the aircraft, the air reaching the eye of the impeller at a pressure somewhat higher than atmospheric pressure due to the ram action as the air is forced through the conduit. Discharge conduit 9 may be connected to any suitable point of consumption. For example, the air may be used to supply combustion air to the engine or it may be used to supercharge a cabin.

The foregoing is to be taken as typical of any suitable turbo-supercharger, the arrangement described being a known one. The regulation of the speed of the supercharger is effected by adjusting waste-gate valve 6. When the waste-gate valve is open, exhaust gases pass from nozzle box 2 directly to atmosphere, little if any passing through the turbine wheel so that at this time the compressor is idle. As waste-gate valve 6 is moved toward closed position, fewer of the gases are discharged to atmosphere and gases are then directed through the nozzles to the turbine wheel to operate it. Maximum output would be represented by waste-gate valve 6 being completely closed whereby all available gases from the aircraft engine are directed to the turbine wheel.

According to my invention, I depart entirely from regulating arrangements heretofore used on gas driven superchargers for aircraft and place the regulator for the supercharger, i. e., waste-gate valve 6, directly under the control of a long range speed governor driven from the supercharger shaft. By this arrangement, the supercharger is controlled directly as to speed. I then provide in connection with the speed governor a means for setting the governor for different speeds of operation. This latter may be accomplished in any suitable manner, such as by loading the governor spring, by adjusting a sleeve valve for the pilot valve of the servo-motor through which the governor actuates the waste-gate valve, or by other suitable means, depending on the type of speed governor utilized in carrying out the invention.

In the present instance, I have shown a speed governor of the flyball type but it is to be understood that my invention is not limited thereto necessarily.

Referring particularly to Fig. 1, 10 indicates a speed governor which is driven from the supercharger shaft through suitable gearing in a well understood manner. It may be a centrifugal governor of any suitable type, a requirement being that it has a range sufficiently long to meet the requirements of the particular control. In the present instance, I have elected to show a flyball governor of known type. The spindle 11 of the governor projects into the pilot valve casing 12 of a pilot valve and carries pilot valve heads 13 and 14. Pilot valve heads 13 and 14 control ports 15 and 16 in a pilot valve sleeve 17 located in pilot valve casing 12 and adapted to slide longitudinally therein. In pilot valve sleeve 17 is an inlet port 18 which communicates with a fluid pressure supply pipe 19 and discharge ports 20 and 21 which communicate with fluid discharge pipes 22 and 23. Pipe 19 may lead from any suitable source of operating fluid, for example, a supply of oil of suitable pressure, and pipes 22 and 23 may lead to any suitable point of discharge. Ports 15 and 16 are connected by conduits 24 and 25 to the cylinder 26 of the servo-motor on opposite sides of the servo-motor piston 27. In the inner wall of casing 12 are elongated chambers through which the respective ports in sleeve 17 connect with the respective conduits so that communication with the conduits is not affected by longitudinal movement of the sleeve.

The left-hand end of sleeve 17 is pivotally connected to one end of a floating lever 28, the other end of which is connected to a piston rod 29 which in turn is connected to piston 27. Piston 27 is provided with a piston rod 30 which is pivotally connected through a link 31 and an arm 32 to waste-gate valve 6. At an intermediate point of lever 28 is a roller 33 which engages with the inclined or cam surface of a wedge-shaped cam member 34 carried on the end of a piston rod 35 connected to a piston 36 located in the cylinder 37 of a fluid actuated motor or servo-motor. Cylinder 37 on opposite sides of piston 36 is connected by conduits 39 and 40 to the casing of a pilot valve 41. The fluid pressure inlet pipe for pilot valve 41 is indicated at 42 and the fluid pressure outlet pipes are indicated at 43 and 44. In the pilot valve casing are pilot valve heads 45 and 46 carried by pilot valve stem 47. This forms a known type of fluid actuated motor or servo-motor. Pipe 42 may lead from any suitable fluid pressure supply and pipes 43 and 44 may lead to any suitable discharge point. Normally, pilot valve heads 45 and 46 cover the ends of conduits 39 and 40. The outer end of pilot valve stem 47 is pivotally connected to an intermediate point of a floating lever 48. One end of lever 48 is pivotally connected to piston rod 35 and the other end is pivotally connected by a link 49 to the central portion of a floating lever 50. One end of floating lever 50 is connected to a hand control lever 51 adjustable to fixed positions along a quadrant 52. Hand control lever 51 is located in reach of and so that it can be positioned by the aircraft operator. The other end of floating lever 50 is pivotally connected to the stem 53 of a Sylphon bellows 54. Bellows 54 is evacuated so that it responds to absolute atmospheric pressure. It is provided interiorly with a compression spring 55 which opposes collapsing of the bellows and which, as the pressure decreases on the outside of the bellows, causes the bellows to expand. Extension of bellows 54 is limited by a suitable stop 56. Bellows 54 is located on the aircraft so as to be subjected to the altitude atmospheric pressure. The foregoing arrangement provides a means for positioning the wedge-shaped member 34 manually by means of hand lever 51 and automatically in response to variations in absolute atmospheric pressure by means of bellows 54, the positioning in each instance being effected through the intermediary of a servo-motor, including a follow-up connection. Pilot valve sleeve 17 is biased to a position in which roller 33 is in engagement with the inclined surface of wedge-shaped member 34 by a spring 58 which surrounds spindle 11 and at one end engages the end of sleeve 17 and at the other end engages a fixed abutment 59. By this arrangement, the sleeve is made to follow the movements of the wedge-shaped member.

The operation is as follows:

Assume that the aircraft on which the supercharger and its control is mounted is operating and that the supercharger is running. At this time, exhaust gases are being supplied from the engine to turbine wheel 1 to operate it, the turbine wheel driving the compressor to supply compressed air through conduit 9. Waste-gate valve 6 will stand in an adjusted position to maintain the speed for which speed governor 10 is set. If the speed tends to increase, the weights of speed governor 10 will move outward against the action of the governor springs, effecting a movement of pilot valve heads 13 and 14 toward the right in Fig. 1 to uncover somewhat ports 15 and 16, thus admitting fluid pressure to the right-hand end of cylinder 26 through port 16 and conduit 25, and permitting it to discharge from the left-hand end thereof through conduit 24 and port 15. This effects movement of piston 27 in a left-hand direction, thus opening somewhat the waste-gate valve to permit a greater percentage of exhaust gases to pass directly to atmosphere so that fewer gases are supplied to turbine wheel 1 whereby the speed of the wheel decreases. When piston 27 moves toward the left, it moves the upper end of lever 28 toward the left, thus moving pilot valve sleeve 17 toward the right until ports 15 and 16 are again covered by pilot valve heads 13 and 14. If the speed of the supercharger decreases, the speed governor moves stem 11 toward the lift and through the pilot valve and piston 27 effects a closing movement of waste-gate valve 6 in the manner already described to increase the amount of gases supplied to the turbine wheel and hence increase the speed of the supercharger. Movement of piston 27 effects movement of pilot valve sleeve 17 in a direction to bring it to a position in which the ports 15 and 16 are again shut off by pilot valve heads 13 and 14. From the foregoing, it will be seen that speed governor 10 operates the waste-gate valve through a servo-motor, including a follow-up device or connection. The speed governor thus maintains the supercharger operating at a substantially constant speed; and at such constant speed, other factors remaining constant, it will deliver air at a constant pressure. The supercharger is under the direct control of a restored speed governor, a type of governor which is sensitive but which at the same time has stable operating characteristics.

If we assume now that the aircraft ascends to a higher altitude, then pressure evacuated bellows 54 will be distended by spring 55 and through stem 53 and floating lever 50, link 49 will lower the left-hand end of floating lever 48, thus moving downward pilot valve heads 45 and 46. Fluid pressure will be admitted from the pilot valve through conduit 40 to the lower end of cylinder 37 which will effect an upward movement of the piston 36 and hence of wedge-shaped member 34, the fluid above piston 36 being discharged through conduit 39 and discharge pipe 43. The upward movement of piston 36 lifts the right-hand end of floating lever 48 and restores pilot valve heads 45 and 46 to position where they again cover the ends of conduits 39 and 40. Upward movement of wedge-shaped member 34 serves to move pilot valve sleeve 17 toward the right, floating lever 28 pivoting on the end of piston rod 29, whereby fluid pressure is admitted through the pilot valve to the left-hand end of cylinder 26, thus moving piston 27 in a direction to effect a closing movement of waste-gate valve 6. This serves to increase the speed of the supercharger, the speed increasing until speed governor 10 moves pilot valve heads 13 and 14 to the right sufficiently to again cover ports 15 and 16. The governor is thus set for a higher speed and will maintain the supercharger at that speed. The arrangement is such that the increase in speed at the higher altitude will be sufficient to give the desired pressure on the discharge side of the compressor. If the aircraft descends to a lower altitude, then bellows 54 is collapsed somewhat to effect the operation just described except in the opposite direction to lower the speed of the supercharger to the value desired for the corresponding altitude.

Operation of bellows 54 in moving sleeve 17 serves in effect to change the setting of speed governor 10, the speed governor itself having direct control of the waste-gate valve.

If the aircraft operator desires to effect adjustment of the setting of the speed governor at any time, he can do so by moving hand lever 51 along the quadrant 52. In the arrangement shown, movement of the hand lever 51 in a clockwise direction serves to lower pilot valve heads 45 and 46 in the pilot valve casing, thus effecting an upward movement of piston 36 in cylinder 37, and movement of pilot valve sleeve 17 in a right-hand direction and hence a setting of the speed governor for a higher speed. Movement of hand lever 51 in an anti-clockwise direction in a similar way effects setting of speed governor 10 for a lower speed.

Speed governor 10 is a long range governor. Sleeve 17 functions as a means for setting the governor for any speed within its range. Hand lever 51 may be adjusted to determine the speed which will be maintained at a given altitude, i. e., for a given position of bellows 54.

Referring to Fig. 2, wherein the abscissas represent altitude and the ordinates speed of the supercharger in revolutions per minute, hand lever 51 may be set so that at altitude $a$ the speed governor will be set to maintain speed $b$. Then the bellows 54 and the mechanism through which it operates sleeve 17 may be so designed and adjusted that as the aircraft ascends the speed will be increased along the line $c$ until the maximum permissible speed for the supercharger is reached at the point $d$, which may represent the critical altitude, i. e., the rated altitude of the supercharger. At this time, the bellows will have reached its stop 56 so that the speed will then remain constant along the line $e$ as the aircraft ascends to higher altitudes. From point $b$ to point $d$ there will be maintained a definite speed-altitude relationship. The relationship may be so set that for each altitude up to critical altitude, the speed of the supercharger will be such that it will deliver air at the desired pressure for that altitude. For example, in the case of supercharging an engine, the speed-altitude relationship may be such that for each altitude, the supercharger will deliver air to the engine at a pressure to give maximum power of the engine.

By adjusting hand lever 51, the operator may change the setting so as to obtain other speed-altitude relationships. For example, by moving hand lever 51 in a clockwise direction, the governor may be set for a higher speed for a given position of bellows 54 so that the speed-altitude relationship will be represented by a line such as the broken line $f$—$g$, while by moving hand lever 51 in an anti-clockwise direction, the governor may be set for a lower speed for a given position of bellows 54 so that the speed-altitude relationship will be represented by a line such as the broken line $h$—$i$.

In Fig. 1, the control mechanism for setting the speed governor is responsive to altitude absolute pressure alone. It may, however, be made responsive to other conditions pertinent to the operation of the supercharger. For example, it may be made responsive to a condition of the air discharged by the supercharger, such as the air discharge pressure or the rate of air flow; to a condition of the gases supplied to the supercharger, i. e., nozzle box pressure, or to a condition of the aircraft engine; or it may be made responsive to various combinations of such conditions. In Fig. 3, by way of example, I have shown an arrangement wherein the setting of the governor is responsive to a combination of absolute atmospheric pressure and to the pressure of the air on the discharge side of the supercharger compressor. In Fig. 3, the same reference numerals the same as in Fig. 1 have been used to designate corresponding parts. In this arrangement, the left-hand end of floating lever 62 corresponding to the lever 50 of Fig. 1 is pivotally connected to a stem 63 which at one end is fixed to the movable end of an evacuated bellows 64 and at the other end is fixed to the movable end of a bellows 65. Evacuated bellows 64 is carried by a fixed abutment 66 and is provided with a compression spring 67 which opposes collapsing of the bellows. It may be in all respects similar to bellows 54. The stationary end of bellows 65 is fixed to a support 68 and has its interior connected by a pipe 69 to the discharge side of the supercharger compressor, i. e., to conduit 9. Thus, the interior of bellows 65 is subjected to pressure on the discharge side of the supercharger, i. e., to supercharger pressure. Bellows 64 and 65 are in opposed relation to each other and are of the same diameter so that each is subjected to altitude atmospheric pressure to the same extent. As a result, bellows 64—65 provide a means responsive to the absolute pressure on the discharge side of the compressor. Surrounding the bellows 65 is a rectangular frame 70, the upper cross-bar of which has an opening through which stem 63 passes loosely and which rests against the movable end of bellows 65. Connected to the lower cross-bar of frame 70 is a spring 71 connected to a hand lever 72 which corresponds to hand lever 51 of Fig. 1 and which may be positioned along a quadrant 73. By adjusting hand lever 72 along the quadrant 73, the effective action or pull of spring 71 on bellows 65 may be adjusted. Spring 71 acts in opposition to the pressure within bellows 65; in other words, bellows 65 tends to be collapsed by spring 71 and to be extended by the supercharger pressure to which its interior is subjected. This arrangement of bellows 64 and 65 provides a device which is responsive to the absolute supercharger pressure.

The operation of the arrangement shown in Fig. 3 is obvious from the description given of the operation of the arrangement shown in Fig. 1. As the altitude of the aircraft changes, bellows 55 operates through floating lever 50 and the servo-motor to position wedge-shaped member 34 and adjust the setting of the speed governor. Likewise, if the pressure on the discharge side of the supercharger varies, it will effect a movement of the bellows 65 to move the left-hand end of floating lever 50 in one direction or the other and through the servo-motor position the wedge-shaped member 34 to adjust the setting of the speed governor. By adjusting hand lever 72, the operator can manually change the calibration of the pressure governor.

If it is desired to control the setting of the speed governor in accordance with nozzle box pressure rather than discharge pressure of the supercharger, then it is only necessary to connect pipe 69 leading from bellows 65 to the nozzle box. This arrangement is indicated in Fig. 4.

In accordance with the provisions of the patent statutes, I have described the principle of operation of my invention together with apparatus representing embodiments thereof but I desire to have it understood that the apparatus shown is only illustrative and that the invention may be carried out by other means.

What I claim as new and desire to secure by Letters Patent of the United States, is:

In combination, an exhaust gas driven supercharger for aircraft, a regulating valve therefor, a long range speed governing mechanism for positioning the valve including a speed governor driven from the supercharger, a servo motor for positioning the valve and a pilot valve for controlling the flow of operating fluid to the servo motor and having a valve stem connected to the speed governor and a bushing connected by a follow-up lever to the servo motor, a variable fulcrum for the lever, and means for manually and automatically setting the speed governing mechanism for different speeds comprising a hydraulic motor connected to the fulcrum, a pilot valve for the hydraulic motor and means for manually and automatically positioning the last named pilot valve including a hand operated lever and a device responsive to changes of pressure appurtenant to the operation of the supercharger.

DAVID R. SHOULTS.